US011460568B2

(12) United States Patent
Bosse

(10) Patent No.: US 11,460,568 B2
(45) Date of Patent: Oct. 4, 2022

(54) ESTIMATING IN-PLANE VELOCITY FROM AN ARBITRARY RADAR RETURN

(71) Applicant: Zoox, Inc., Foster City, CA (US)

(72) Inventor: Michael Carsten Bosse, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 352 days.

(21) Appl. No.: 16/556,126

(22) Filed: Aug. 29, 2019

(65) Prior Publication Data

US 2021/0063560 A1   Mar. 4, 2021

(51) Int. Cl.
*G01S 13/50* (2006.01)
*G01S 13/58* (2006.01)
*G01S 13/93* (2020.01)

(52) U.S. Cl.
CPC .......... *G01S 13/505* (2013.01); *G01S 13/589* (2013.01); *G01S 13/93* (2013.01); *B60W 2420/52* (2013.01)

(58) Field of Classification Search
CPC ...... G01S 13/505; G01S 13/589; G01S 13/93; G01S 7/4026; G01S 7/4034; G01S 7/415; G01S 13/66; G01S 13/60; G01S 13/865; G01S 13/867; G01S 2013/9316; G01S 2013/9318; G01S 2013/93185; G01S 2013/9319; G01S 2013/932; G01S 2013/93271; G01S 2013/93273; B60W 2420/52
See application file for complete search history.

(56) References Cited

U.S. PATENT DOCUMENTS

| 2017/0248688 A1 | 8/2017 | Campbell et al. |
| 2018/0024228 A1* | 1/2018 | Schiffmann ........... G01S 13/931 342/174 |
| 2018/0045811 A1* | 2/2018 | Cao ........................ G01S 13/931 |
| 2019/0094877 A1* | 3/2019 | Smith ........................ G01S 7/06 |

(Continued)

FOREIGN PATENT DOCUMENTS

| EP | 3301474 A1 | 4/2018 |
| WO | WO2019042523 A1 | 3/2019 |

OTHER PUBLICATIONS

The International Preliminary Report on Patentability for PCT Application No. PCT/US20/47950, dated Mar. 10, 2022.

(Continued)

*Primary Examiner* — Donald H B Braswell
(74) *Attorney, Agent, or Firm* — Lee & Hayes, P.C.

(57) ABSTRACT

Techniques for accurately determining a velocity of a radar (or ultrasonic, sonar) device and/or a moveable platform associated with the radar device may comprise fitting a model to a set of Doppler values received from the device, and determining the velocity based at least in part on the model. Fitting the model to the set may comprise determining a residual between an estimated Doppler value generated by the model and a measured Doppler value and altering a parameter of the model based at least in part on an asymmetrical loss function and the residual. The asymmetrical loss function may comprise a first portion that comprises a square of the residual and a second portion that is linearly proportional to the residual. The second portion may be based at least in part on an estimated velocity and/or estimated Doppler value and may account for out-of-plane returns.

17 Claims, 8 Drawing Sheets

(56) References Cited

U.S. PATENT DOCUMENTS

2019/0188862 A1* 6/2019 Natroshvili .......... G06N 3/0454
2019/0327124 A1* 10/2019 Lai ........................... H04B 1/38
2020/0057090 A1* 2/2020 Stachnik ................. G01S 13/42

OTHER PUBLICATIONS

The PCT Search Report and Written Opinion dated Nov. 24, 2020 for PCT application No. PCT/US20/47950, 17 pages.

* cited by examiner

ESTIMATING IN-PLANE VELOCITY FROM AN ARBITRARY RADAR RETURN

BACKGROUND

Radar generally measures the distance from a radar device to the surface of an object by transmitting a radio wave and receiving a reflection of the radio wave from the surface of the object, which may be read by a sensor of the radar device. The radar device may transmit the radio waves and, based on the sensed reflection, generate a range measurement indicating the distance from the sensor to the surface, as well as any rate of change of the surface (e.g., using a Doppler measurement).

However, due to limitations of radar devices, such sensed reflections may comprise reflections from surfaces outside the plane of transmission. The sensor may generate a signal associated with the out-of-plane return, which the radar device may use to determine a range measurement. Traditional radar devices do not disambiguate returns generated from surfaces outside the transmission/reception plane and from those within the transmission/reception plane, nor do traditional radar devices compensate for out-of-plane returns. Thus, the true range associated with such a return may be longer than indicated by the range measurement determined by the radar device, and the Doppler measurement may, accordingly, be slower than the true Doppler associated with the surface.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
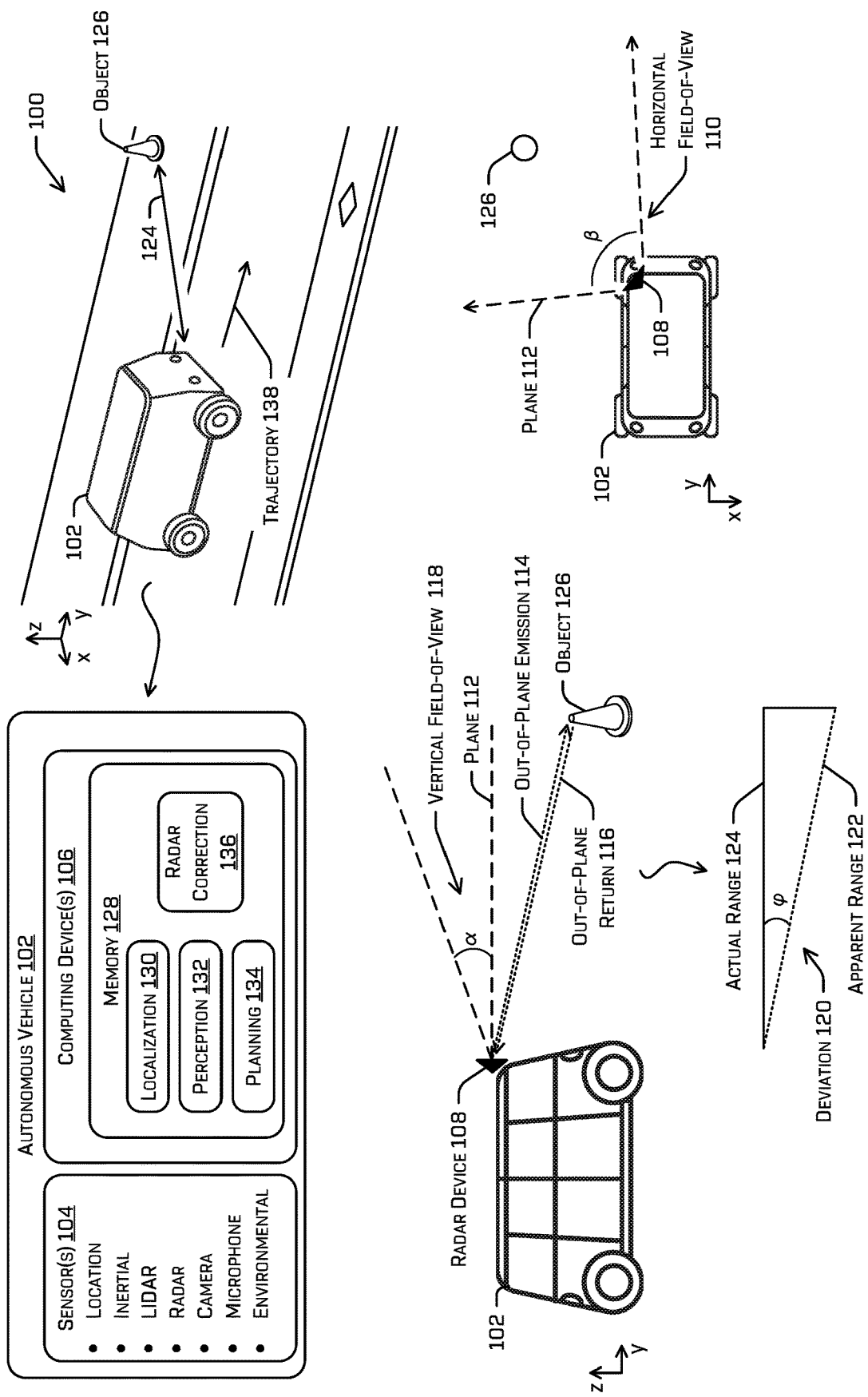
FIG. 1 illustrates an example scenario where a radar device of an autonomous vehicle may generate a range and/or Doppler measurement that is incorrect due to an out-of-plane return.

Techniques for accurately determining a velocity of a radar device and/or an object with which the radar device is associated (e.g., an autonomous vehicle that includes the radar device) from radar data, may comprise receiving radar data from a radar device, identifying static object detections in the radar data by fitting a model to the radar data, and determining the velocity based at least in part on the fitted model. The techniques discussed herein enable accurate determination of the velocity even though the radar data may comprise out-of-plane returns. In some examples, determining the velocity of the object may comprise determining an "in-plane" velocity of the object, i.e., a velocity of the object relative to the transmission/reception plane of the radar device and/or relative to a pose of the object (e.g., a longitudinal axis of a vehicle) that is based at least in part on a Doppler measurement of one or more stationary objects in the environment surrounding the radar device.

Determining a velocity of the autonomous vehicle may comprise fitting a model to radar data, wherein the model is designed to detect stationary objects surrounding the autonomous vehicle and account for noise while accounting for the skewing effect of out-of-plane returns. For example, the model may comprise a sinusoid and fitting the model to the radar data may comprise an M-estimation of the model that is based on an asymmetrical loss function. The asymmetrical loss function may account for both general noise (e.g., noise from electromagnetic radiation from sources other than the transmitter of the radar device) and "out-of-plane" returns that may be associated with inaccurate range measurements and/or Doppler measurements.

In some examples, the asymmetrical loss function may comprise a first portion that may account for general noise and a second portion that may account for general noise and the out-of-plane returns. For example, the asymmetrical loss function may be similar to a Huber loss function. The first portion of the asymmetrical loss function may comprise a quadratic, L2, and/or Gaussian-type loss for handling the general noise. The second portion may comprise a linear (e.g., scaled L1) loss function that accounts for the skewing effect of out-of-plane returns. The first portion may (e.g., quadratically) penalize a parameter associated with the model based at least in part on radar data associated with an error that meets or exceeds a threshold and the second portion may (e.g., linearly) penalize (e.g., determine a loss for adjusting) a parameter associated with the model based at least in part on radar data associated with an error that is below the threshold error.

In some examples, an autonomous vehicle may generate a trajectory for controlling operation of the autonomous vehicle based at least in part on the velocity and/or range determined by the techniques discussed herein. The techniques may thereby improve the safety and efficacy of operation of the autonomous vehicle. In some examples, the techniques improved Doppler measurement accuracy by up to 15 centimeters per second over other methods, such as linear least squares. Moreover, the techniques discussed herein may increase the accuracy of sensor fusion since sensor fusion may be predicated on localization of the sensors and/or an object with which the sensors are associated. An error of 15 centimeters per second may be enough to prevent useable sensor fusion (e.g., for autonomous control applications) since an error of 15 centimeters per second may be enough to cause a sensor fusion system to be unable to disambiguate between objects and/or data associated therewith.

Moreover, localization—determining where an object is located, how the object is oriented, and/or how the object is operating relative to an environment surrounding the object is critical for systems that rely on a presupposition of the location/orientation of the object. For example, autonomous vehicles may predicate control instructions (e.g., how fast/far to drive, how to turn) on an indication of where the autonomous vehicle is within an environment and/or how the autonomous vehicle is oriented and/or operating relative to the environment. The techniques may thereby improve the safety and efficacy of the control instructions determined by the autonomous vehicle by correcting the out-of-plane error.

The techniques may additionally or alternatively be used to calibrate a radar device.

As used herein, an "out-of-plane" return may comprise a return of a radio wave emitted by a radar device from a surface that is outside the plane upon which range and/or Doppler measurements are predicated (e.g., the radar device may emit and/or receive radio waves primarily along the plane, although some power make return from outside the plane returns from surfaces within the plane are referred to as "in-plane" returns). The ensuing discussion primarily discusses the techniques discussed herein in relation to determining a velocity and in regard to an autonomous vehicle that comprises a radar device, although it is understood that the techniques may be used additionally or alternatively to determine a range measurement and/or to determine a velocity of the radar device itself or any object that integrates or is otherwise coupled with the radar device. Moreover, although radio waves are primarily discussed, it is understood that radar devices may emit/receive light in other spectra (e.g., microwaves, mmwave) and/or the techniques discussed herein may apply to other spectra and/or other devices that determine a doppler such as, for example, an ultrasonic and/or sonar sensor. The discussion herein presumes that the orientation of a radar device relative to a pose of the vehicle is known.

In some examples, object detections output by a radar device may comprise data related to a return signal associated with the object detection, such as a range (e.g., distance from the radar device to a surface of the detected object that reflected the radio wave), received power associated therewith (e.g., magnitude of the return signal associated with the object detection), azimuth (e.g., yaw angle associated with the return signal and the object detection's location in the environment relative to the radar device), and/or Doppler (e.g., velocity of the detected object relative to the radar device). In some examples, the radar data may additionally or alternatively comprise a signal-to-noise ratio (SNR) and/or or a radar cross section (RCS) associated with the object detection.

Note that, as used herein, a "return signal" is a portion of a signal generated by a sensor responsive to a reflection of radio waves from an object to the sensor. An "object detection," as relates to radar data, may comprise an indication generated by a radar device that an object has been detected, based at least in part on identifying a return signal.

Example Scenario

FIG. 1 illustrates an example scenario 100 including an autonomous vehicle 102 that may determine an in-plane velocity of the autonomous vehicle 102 based at least in part on sensor data, correcting for out-of-plane returns. The techniques discussed herein may also be used to determine an in-plane range to an object, although, for simplicity, the discussion herein primarily regards Doppler. Moreover, although the discussion herein regards a velocity/range associated with an autonomous vehicle 102, it is understood that, if the radar sensor is fixed and/or otherwise coupled to the autonomous vehicle 102, the velocity/position determined herein may be a velocity and/or position of the radar that may be transformed from a first frame of reference associated with the radar device (e.g., a radar pose coordinate frame) to a frame of reference associated with the autonomous vehicle (e.g., an inertial coordinate frame, a pose frame, an environment frame).

In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to airspace object detection, manufacturing, augmented reality, etc. Moreover, even though the autonomous vehicle 102 is depicted as a land vehicle, autonomous vehicle 102 may be a spacecraft, watercraft, and/or the like.

According to the techniques discussed herein, the autonomous vehicle 102 may receive sensor data from sensor(s) 104 of the autonomous vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the autonomous vehicle 102. However, in other examples, some or all of the sensor(s) 104 and/or computing device(s) 106 may be separate from and/or disposed remotely from the autonomous vehicle 102 and data capture, processing, commands, and/or controls may be communicated to/from the autonomous vehicle 102 by one or more remote computing devices via wired and/or wireless networks.

In particular, the sensor(s) 104 may comprise one or more radar devices, which may generate radar data, and/or any other sensors that may determine a doppler, such as one or more ultrasonic sensors. FIG. 1 depicts an example representation of a radar device 108, which may be associated with autonomous vehicle 102 and/or may collect radar sensor data as the autonomous vehicle 102 traverses the environment.

In some examples, the radar device 108 may have a horizontal field of view 110, β, covering at least a portion of the environment surrounding the autonomous vehicle 102, i.e., a scanned region. The horizontal field of view 110, β, may be associated with and/or define plane 112. Note that, in the depicted instance, antennas and/or sensors of the radar device 108 are oriented to transmit/receive radio waves in a plane 112 spanning a yaw/horizontal angle relative to the autonomous vehicle 102, but, in additional or alternate examples, the antennas and/or sensors may be oriented such that the plane 112 may be oriented vertically (i.e., having a span associated with a pitch of the autonomous vehicle 102) or in any other configuration. It is noted that other types of radar exist that transmit/receive radio waves in a conical or other three-dimensional space and may determine an elevation (altitude) associated with returns, but the techniques discussed herein apply to radar devices that that do not determine or do not accurately determine an elevation and/or height associated with a radar return.

In the illustrated example, the horizontal field of view 110, β, is depicted as being about a 70-degree view. However, in other examples, the field of view can be greater than (e.g., 90 degrees, 120 degrees, 180 degrees, 220 degrees, 270 degrees, 360 degrees) or less than (e.g., 60 degrees, 45 degrees) this angle. Moreover, the radar device 108 may include multiple radar transmitter/sensor pairs having multiple different fields of view, distances, scan rates, and the like. In some examples, the autonomous vehicle 102 may include multiple radar devices with at least partially overlapping fields of view such that multiple radar sensors capture at least portion of the environment in common. In various examples, the autonomous vehicle 102 may have any number of one or more radar devices (1, 2, 4, 5, 8, 10, etc.).

Although the radar device 108 may be configured to transmit and receive electromagnetic radiation in plane 112, some of the power from the transmission may be transmitted outside the plane 112, such as out-of-plane emission 114, causing reflections from outside plane 112, such as out-of-plane return 116. Out-of-plane return 116 may be a reflection of out-of-plane emission 114. Power may be transmitted outside the plane 112 due to optical diffraction, a shape of a lobe of the electric and/or magnetic field of the emission (e.g., a modality of the radio wave emission may be associated with an electric and/or magnetic field lobe outside the plane 112, at least partially), and/or the like. Such out-of-plane transmissions/reflections may be associated with a vertical field of view 118, α. The vertical field of view 118, α, may vary wildly between radar models and measures taken to reduce or increase the vertical field of view 118. In some examples, the vertical field of view 118, α, may be 10-15 degrees, although, depending on the radar device 108 configuration it may be more or less.

The radar device 108 may be configured to output an object detection comprising a range measurement, azimuth (e.g., scanning angle at which the object was detected, which is a yaw (in plane 112) relative to the autonomous vehicle 102), Doppler (i.e., velocity/rate of range change associated with the detected object), received power (e.g., magnitude and/or power of the return signal), SNR (signal to noise ratio), and/or RCS (radar cross section) associated with the detected object, for a return signal generated at a sensor of the radar device 108 responsive to radio waves incident on the sensor. The radar data may comprise one or more object detections indicating data indicative of the return signal(s) associated therewith.

For a radar device 108 that does not determine elevation associated with a return (and therefore does not correct for a deviation 120 of an out-of-plane returns from the plane 112), the radar device 108 may output an apparent range 122 associated with out-of-plane return 116 received at a sensor of the radar device 108. The problem is that the apparent range 122 is based on a presupposition that the out-of-plane return 116 was received from a surface in plane 112. Therefore, the actual range 124 associated with the out-of-plane return 116 is shorter than the apparent range 122 indicates. For example, if the out-of-plane return 116 was received at an altitude of −10 degrees (i.e., the deviation 120, φ, from the plane 112 is 10 degrees altitude/pitch relative to the plane 112), the actual range 124 would be 1.52% (1−cos(10°)) less than the apparent range 122 output by the radar device 108 in association with the object 126 that caused the reflection. For an apparent range 122 of 10 meters, this results in a −15.2 cm error, which is significant enough to degrade sensor fusion to the point of being near useless for autonomous control and/or may present a safety risk, since typical city street speeds exceed 10 meters per second, giving the autonomous vehicle 102 less than a second to detect and/or rectify the error. This is referred to herein as the "out-of-plane skew" or "cosine contribution/error." The actual deviation 120 may not be measured by the radar device 108 in the examples discussed herein. Although the depicted and discussed example discusses range, this out-of-plane skew similarly affects Doppler measurements.

In some examples, the computing device(s) 106 may receive radar data from the sensor(s) 104. Computing device(s) 106 may comprise a memory 128 storing a localization component 130, a perception component 132, a planning component 134, and/or a radar correction component 136. In general, localization component 130 may comprise software and/or hardware system(s) for determining a pose (e.g., position and/or orientation) of the autonomous vehicle 102 relative to one or more coordinate frames (e.g., relative to the environment, relative to a roadway, relative to an inertial direction of movement associated with the autonomous vehicle). In some examples, the localization component 130 may determine a position, orientation, and/or velocity of the vehicle based at least in part on radar data.

In some examples, the radar correction component 136 may receive radar data from one or more radar sensors, determine a model that fits the radar data, and provide the model to the localization component 130. The localization component may use the model to determine a position, orientation, and/or velocity of the vehicle based at least in part on the model (and a predicate indication of an orientation of the one or more radar sensors relative to an orientation of the autonomous vehicle 102). For example, the model may comprise a sinusoid (indicative of stationary objects while the autonomous vehicle 102 is moving) of estimated Doppler values over a range of azimuths. The localization component 130 may determine the velocity of the autonomous vehicle 102 based at least in part on an estimated Doppler value and azimuth associated therewith, as indicated by the model.

The perception component 132 may determine what is in the environment surrounding the autonomous vehicle 102 and the planning component 134 may determine how to operate the autonomous vehicle 102 according to information received from the localization component 130 and/or the perception component 132. The localization component 130, the perception component 132, and/or the planning component 134 may include one or more machine-learned (ML) models and/or other computer-executable instructions.

In some instances, the perception component 132 may additionally or alternatively determine data related to objects in the vicinity of the autonomous vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception component 132 may be collectively referred to as "perception data." Once the perception component 132 has generated perception data, the perception component 132 may provide the perception data to the planning component 134.

The planning component 134 may use the perception data and/or localization data received from localization component 130, including the range and/or velocity determined by the localization component 130 as discussed herein, to localize a position of the autonomous vehicle 102 on a global map and/or a local map (which may additionally or alternatively be accomplished by an unillustrated localization component), determine one or more trajectories, control motion of the autonomous vehicle 102 to traverse a path or route, and/or otherwise control operation of the autonomous vehicle 102, though any such operation may be performed in various other components (e.g., localization may be performed by a localization engine, not shown). For example, the planning component 134 may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second) and based at least in part on the velocity and/or range determined by the localization component 130 to control the vehicle to traverse the route (e.g., in order to avoid any of the detected objects); and select one of the potential trajectories as a trajectory 138 of the autonomous vehicle 102 that may be used to generate a drive control signal that may be transmitted to drive components of the autonomous vehicle 102. FIG. 1 depicts an example of such a trajectory 138, represented as an arrow indicating a heading, velocity, and/or acceleration, although the trajectory itself may comprise instructions for a PID controller, which may, in turn, actuate a drive system of the autonomous vehicle 102.

Example Error Graphs

Figure 2:
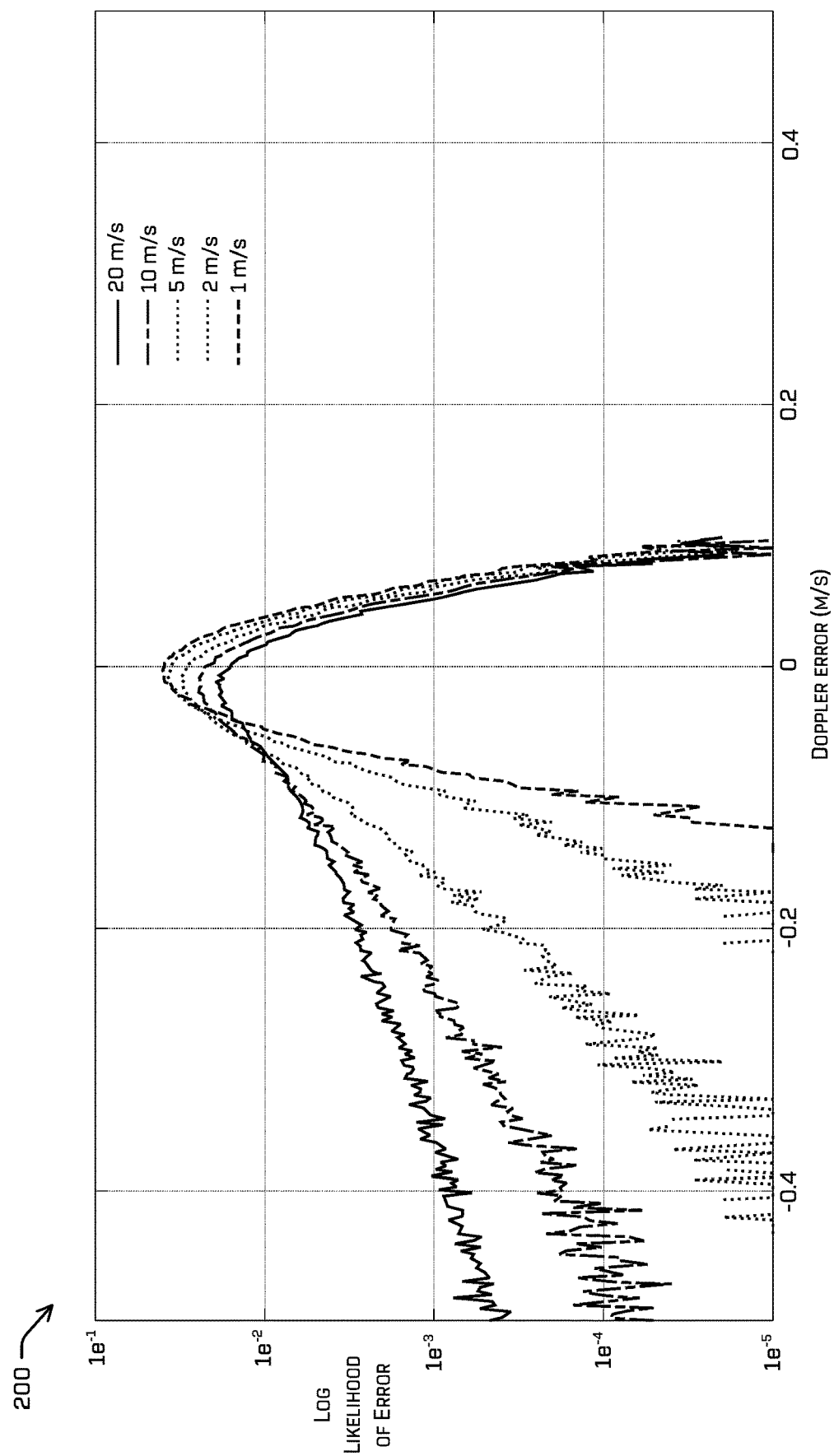
FIG. 2 illustrates a graph of simulated log likelihoods of error in Doppler measurements due to the out-of-plane error discussed herein.

FIG. 2 depicts a graph 200 of simulated log likelihoods of error in Doppler measurements due to the out-of-plane error discussed herein. The x-axis of FIG. 2 indicates Doppler error in meters per second (e.g., measured value minus actual value, which may be determined based at least in part on a reference trajectory generated by a planning component of the vehicle and/or other sensor modalities associated with vehicle, such as wheel encoders, GPS, and/or the like) and the y-axis of FIG. 2 indicates the logarithmic value of the likelihood (e.g., posterior probability) of achieving a Doppler error of the magnitude indicated by the x-axis. The various lines, dashed differently, indicate different vehicle (radar) speeds. Although general radar error due to noise may be modeled using a Gaussian, as the right-hand side (positive Doppler errors) of the distribution demonstrate, the out-of-plane error is non-Gaussian. As the graph 200 depicts, the out-of-plane error only contributes to the overall error for negative Doppler errors and is increasingly significant as vehicle speed increases (cf. likelihood of a −0.4 m/s error while the vehicle is travelling 20 m/s is approximately 0.001, whereas the likelihood of a −0.4 m/s error at a vehicle speed of 5 m/s is approximately 0.00001 note that the these values are logarithmic). This is because the out-of-plane error will causes underestimation of the range/Doppler—the cosine of an angle will always be 1 or less, so range measurement will either be in-plane and subject to normal noise interference, or out-of-plane and scaled by a value less than 1, according to the unknown deviation angle.

The shape of the loss function discussed herein (for adjusting parameters of the model) may correspond to the general shape of the log likelihood of error. A first portion of the loss function may be quadratic, similarly to the right-hand side of the log likelihood of error. A second portion of the loss function may be linear or substantially linear, similarly to the left-hand side of the log likelihood of error, although for low or zero velocity the loss function may be entirely quadratic (e.g., notice how the left-hand side of the 1 meter per second log likelihood of error is closer to a quadratic than the other speeds). Also note that, as the vehicle speed increases, the point of inflection becomes increasingly negative. The loss function may thereby include a threshold delineating the first portion from the second portion of the loss function. This threshold is identified as the Greek letter "delta" below. Of course, any number of representations of such a log likelihood is contemplated (polynomial, Taylor approximations, piece-wise approximations, and the like).

Figure 3:
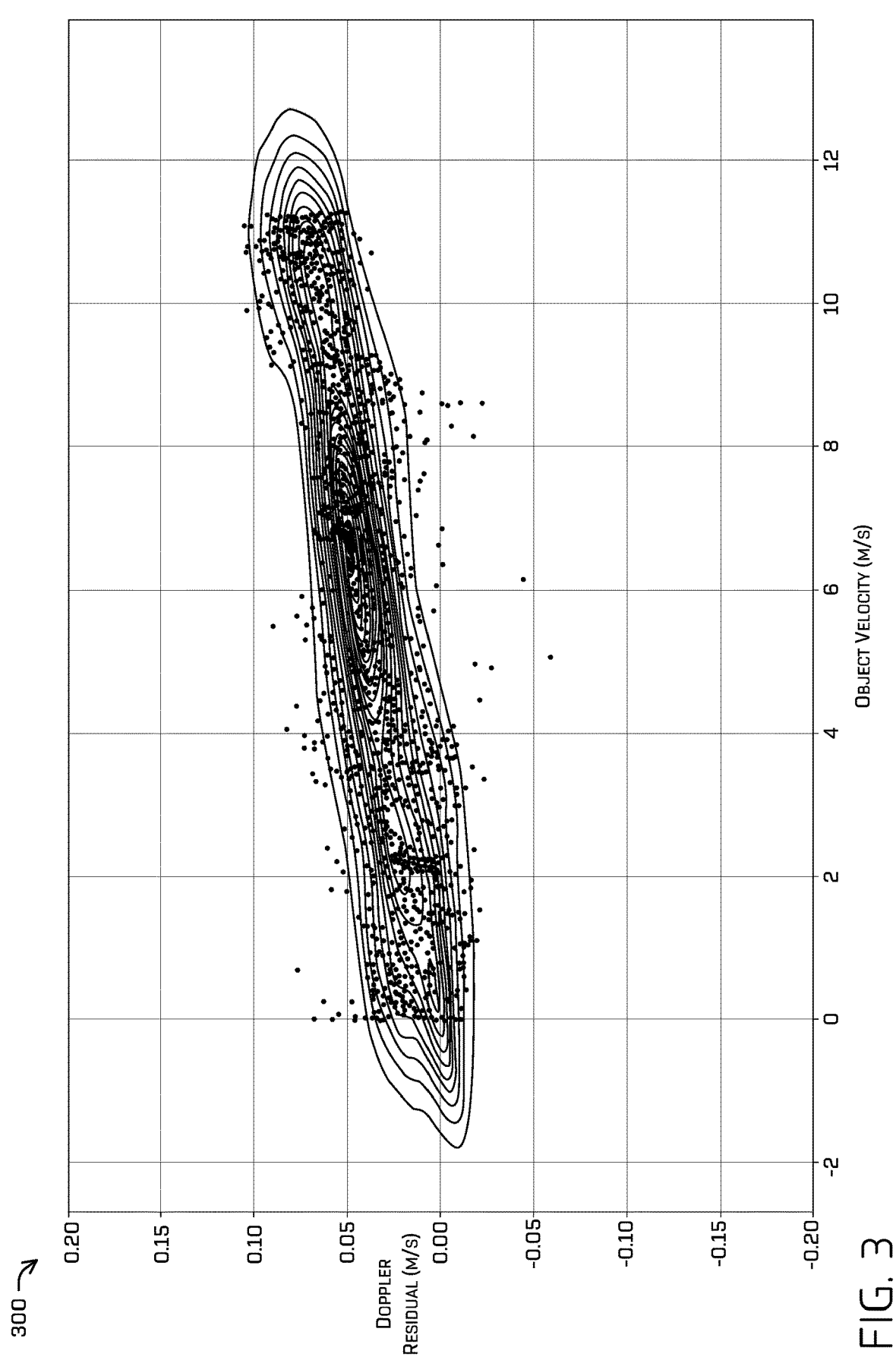
FIG. 3 illustrates a graph of the velocity-dependent skew created by out-of-plane returns.
Figure 4:
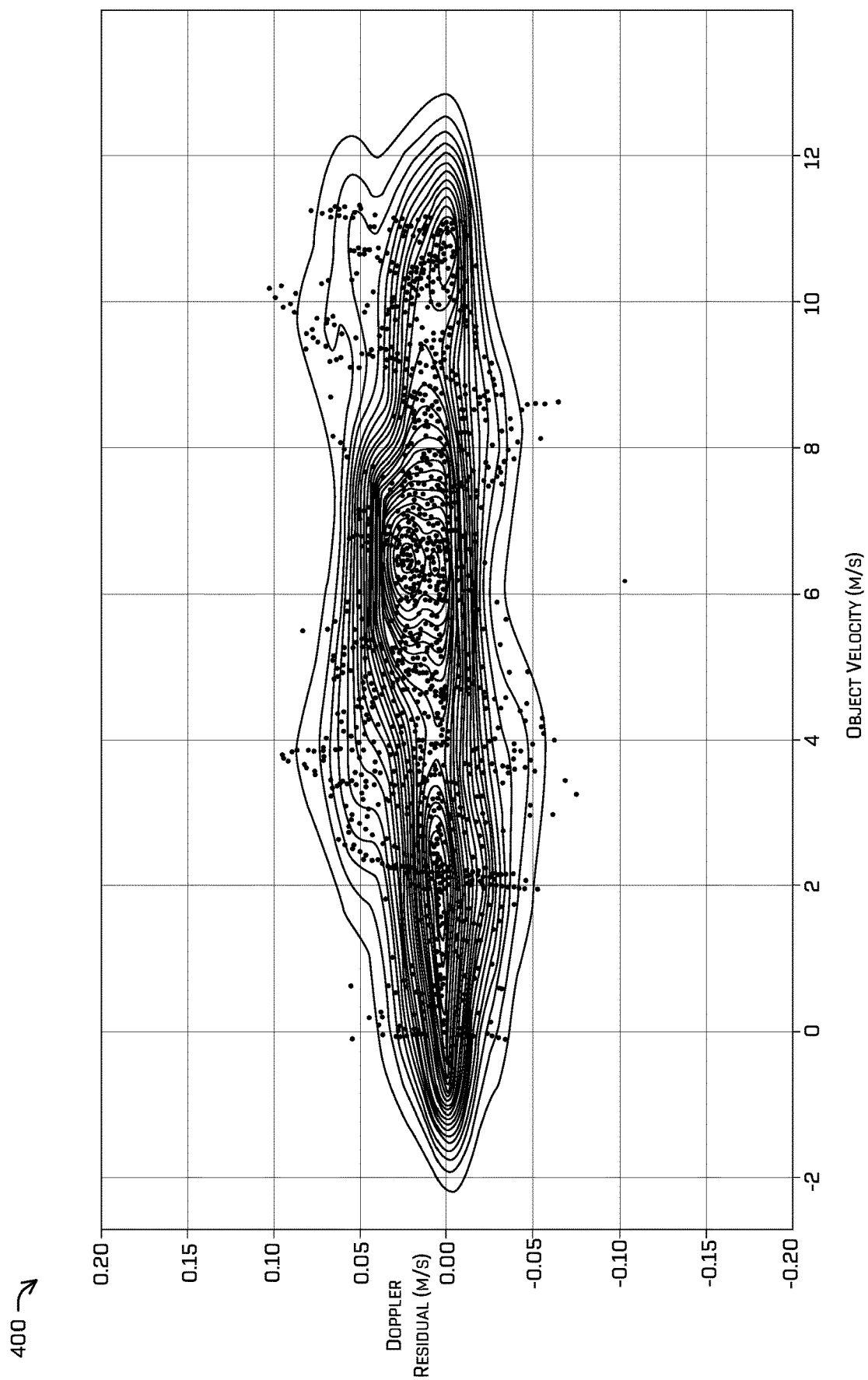
FIG. 4 illustrates a graph of the same radar data depicted in FIG. 3 corrected according to the techniques discussed herein.

FIG. 3 depicts a graph 300 that further illustrates the contribution of vehicle (radar device) velocity to the out-of-plane skew. FIG. 4 depicts a graph 400 that illustrates the correction of the skew provided by the techniques discussed herein. FIGS. 3 and 4 plot object (vehicle/radar) velocity in meters per second on the x-axis and average Doppler residual in meters per second on the y-axis. Residual, as used herein, is the difference between a measurement and the prediction associated therewith. A Doppler residual, then, is a difference between a measured Doppler value and the Doppler value predicted by the model. Parameters of the model are determined/adjusted based at least in part on a loss function. Each point in FIGS. 3 and 4 represents an average residual associated with a radar data collection—e.g., one iteration of the radar through the whole field of view of the radar device, which may comprise making a 360° revolution—and the contour lines indicate density of the points. Each collection may generate hundreds or thousands of Doppler measurements associated with the environment. A residual value depicted in FIG. 3 (i.e., a particular point) is the difference between the measured Doppler value and a predicted Doppler value determined by a model adjusted by a loss function that employs a Gaussian least squares error method, but does not account for out-of-plane returns. FIG. 3 further illustrates the effect of object velocity on Doppler residual—as the object (radar) velocity increases, so, too, does Doppler residual, as the rotated orientation of the contour lines suggest.

FIG. 4, on the other hand, depicts the residuals for the same set of radar data as depicted in FIG. 3, but corrected according to the techniques discussed herein. For example, a residual value depicted in FIG. 4 is the difference between the measured Doppler value and a predicted Doppler value determined by a model adjusted by the asymmetrical loss function discussed herein. FIG. 4 illustrates that the techniques discussed herein effectively removes the out-of-plane effect on the residuals, as seen in the substantially horizontal residual density contours in FIG. 4.

Example Process

Figure 5:
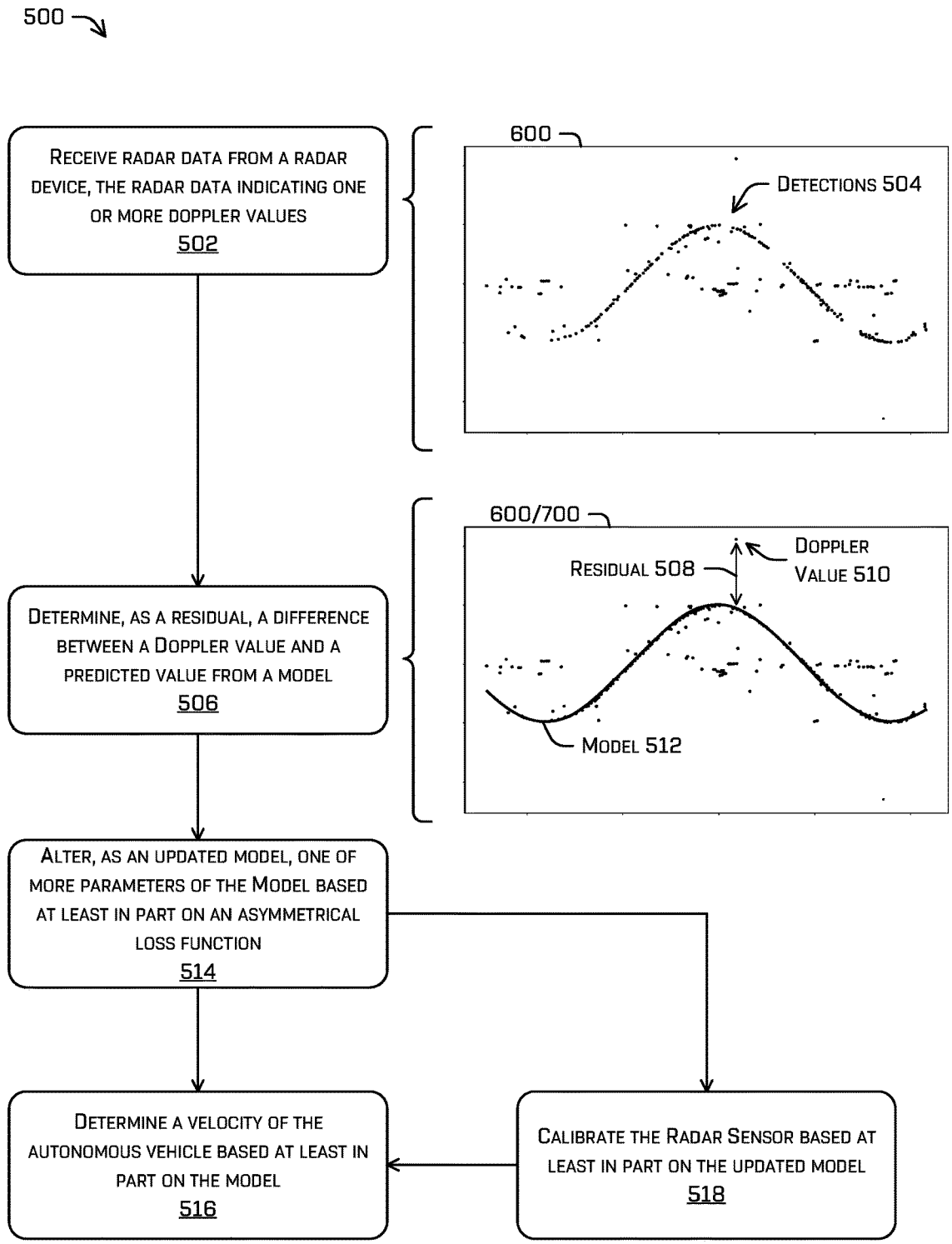
FIG. 5 illustrates a pictorial flow diagram of an example process for correcting radar data for out-of-plane return error contributions and determining a velocity and/or position of an autonomous vehicle based at least in part on the corrected radar data.

FIG. 5 illustrates a pictorial flow diagram of an example process 500 for correcting radar data for out-of-plane return error contributions and determining a velocity and/or position of an autonomous vehicle (or moveable platform associated with the radar sensor) based at least in part on the corrected radar data. Example process 500 may additionally or alternatively comprise calibrating the radar sensor based at least in part on the corrected radar data (e.g., determining an orientation discrepancy between a measured direction of travel and a lateral velocity determined based at least in part on the calibration (e.g., a lateral velocity and/or a phase shift of the model)). In some examples, determining the velocity and/or position may be determined based at least in part on a corrected Doppler value or, in an additional or alternate example, the velocity and/or position may be determined based at least in part on a model fit to the radar data. In some examples, example process 400 may comprise a technique for fitting such a model to the radar data that correctly accounts for the out-of-plane returns.

At operation 502, example process 500 may comprise receiving radar data from a radar device, the radar data indicating one or more detections, according to any of the techniques discussed herein. In some examples, an object detection may comprise an indication of at least a range, Doppler, and/or azimuth associated with a return signal identified by the radar device, although an object detection may additionally or alternatively indicate a received power, SNR, and/or RCS associated with a detected object. For the sake of clarity, the discussion herein primarily regards Doppler and azimuth, although it is understood that the techniques discussed herein may be based on less or more data. FIG. 5 includes a depiction of detections 504 (also represented in example graph 600 of FIG. 6) having various Dopplers and azimuths. Note that, as the vehicle moves, Doppler values associated with stationary objects may appear as part of a sinusoid, since the rate of change of range between the radar device and the stationary object may change sinusoidally as the object approaches the stationary object (e.g., the rate of change of range to an object that is lateral/at 90° to the autonomous vehicle will be zero, unless the vehicle is laterally slipping, whereas the rate of change of range to an object that is straight ahead of the autonomous vehicle will be at its greatest, assuming the vehicle is travelling straight ahead).

At operation 506, example process 500 may comprise determining, as a residual, a difference between a (measured) Doppler value and a predicted value from a model, according to any of the techniques discussed herein. In some examples, the predicted value may be initially determined (e.g., the model initialized) based at least in part on an azimuth, a previously-determined Doppler value, a random sample consensus (RANSAC) associated with the radar data, sensor data comprising a measured velocity, and/or a trajectory indicating a target velocity received from a computing device (e.g., received from the planning component). In any one or more of the above examples, outliers may be rejected (e.g., using an additional loss function) as a pre- and/or post-processing step in order to achieve a better fit to such static objects. FIG. 5 depicts a residual 508 between a particular Doppler value 510 and the model 512, as depicted in more detail in FIGS. 6 and 7 and example graphs 600 and 700, respectively.

At operation 514, example process 500 may comprise altering, as an updated model, one or more parameters of the model based at least in part on an asymmetrical loss function, according to any of the techniques discussed herein. In some examples, the altering may be part of a fitting process initialized with a parameter estimation method such as random sample consensus (RANSAC) to more quickly identify the parameters of the model. In an additional or alternate example, the fitting process may be initialized based at least in part on a randomized estimation, an estimation based at least in part on observed Doppler values, a previously-determined velocity (and/or a velocity calculated using other sensors—e.g., wheel odometry, visual-inertial odometry, IMUs, and the like), and/or a reference trajectory received from the planning component.

In some examples, operation 514 may comprise adjusting, as an updated model, a parameter of the model based at least in part on an asymmetrical loss function. In some examples, the asymmetrical loss function may comprise or be similar to a Huber loss function, a Cauchy loss function, a Lorentzian loss function, and/or the like. The asymmetrical loss function may comprise a first component that determines that determines an L2 (quadratic/Gaussian)-type loss and a second component that determines an L1 (linear)-type loss. In some examples, the second component may scale the loss based at least in part on a velocity associated with the object (e.g., the scalar may be based at least in part on the measured Doppler value(s), an estimated velocity, a previously-determined velocity, and/or a reference trajectory received from the planning component).

Operation 514 may comprise determining a first subset of the radar data associated with first residuals that exceeds a threshold and a second subset of the radar data associated with second residuals that do not meet or exceed the threshold. In some examples, the asymmetrical loss function may be used as part of an M-estimator that determines and/or adjusts a parameter of the model (e.g., non-linear least squares fit). In some examples, the threshold residual may be 0. In some examples, a first component of the asymmetrical loss function may quadratically penalize one or more parameters of the model based at least in part on the first subset, and the second component of the asymmetrical loss function may linearly penalize one or more parameters of the model based at least in part on the second subset. For example, the parameters may comprise, a scalar (amplitude, e.g., a velocity of the vehicle), frequency, phase, mean, standard deviation, and/or any other parameter. In some examples, the second loss function may be configured to account for the contribution of the out-of-plane returns by weighting such returns less heavily than the returns penalized by the first loss function.

Generally, the asymmetrical loss function may determine a loss for altering one or more parameters of the model based at least in part on an equation similar to the following representation:

$$L(a_n) = \begin{cases} \frac{1}{2}a_n^2 & \text{for } a_n > -\delta \\ -\delta a_n - \frac{1}{2}\delta^2 & \text{for } a_n \leq -\delta \end{cases} \quad (1)$$

$$\text{where } \delta = \frac{\sigma_d^2}{f(x_n)\alpha^2} \quad (2)$$

$$\text{where } a_n = y - f(x_n)a \quad (3)$$

where $a_n$ represents the residual value of an n-th observed/measured Doppler value, $x_n$, of the radar data (i.e., the difference between the measured doppler values, y, and the doppler values predicted by the model, f, for observed value $x_n$), $\sigma_d^2$ represents the doppler noise variance, and a represents the vertical field of view. As such, the second component may linearly adjust the model inversely proportional to a doppler value and/or a vertical field of view.

In some examples, operation 514 may additionally or alternatively comprise an additional loss function that removes outliers. For example, the outlier loss function may remove a Doppler value that is associated with a residual that meets or exceeds an outlier threshold. For example, Doppler value 510 may be an example of a Doppler value associated with a residual that meets or exceeds the outlier threshold. In either operation 514 or 516, various optimization procedures may be utilized to determine the update to the model parameters (e.g., non-linear least squares, iterative weighted least squares, gradient loss, or the like) based on the loss function contemplated and the residuals determined. In any such optimizations, the velocity (either represented as a longitudinal and/or lateral component, or as a magnitude and phase) may be the variable optimized. Such optimized velocity comprising the estimated velocity of the vehicle.

At operation 516, the example process 500 may comprise determining a velocity and/or position of the autonomous vehicle based at least in part on the model, according to any of the techniques discussed herein. For example, operation 516 may comprise determining a longitudinal component and/or lateral component of the velocity. In some examples, determining the velocity may be based at least in part on an amplitude, shift, and/or skew associated with a sinusoid of the model. For example, determining the velocity may be based at least in part on determining a maximum amplitude associated with a sinusoid indicated by the model, an azimuth associated with the maximum amplitude, and/or a shift associated with the sinusoid. Operation 516 may additionally or alternatively comprise detecting a lateral slip and/or longitudinal slip based at least in part on a shift of a maximum of the sinusoid to the left or right of the 0° azimuth (or whatever azimuth represents dead ahead of the autonomous vehicle) and/or an amplitude deviation of the maximum of the sinusoid compared to a reference trajectory generated by the planning component.

In some examples, operation 516 may additionally or alternatively comprise modifying the estimated velocity based at least in part on a lever arm effect. For example, if the radar device is located at an outer corner of an autonomous vehicle, during a turning operation of the autonomous vehicle, a velocity at the center of the autonomous vehicle may be different than a velocity of the radar sensor due to the lever arm between the center and the location of the radar sensor. In some examples, the estimated velocity may be reduced based at least in part on crossing the yaw rate associated with the turning operation with a lever arm vector associated with a relative position of the radar sensor to the center of the vehicle.

In some examples, the planning component may generate a trajectory based at least in part on the velocity and/or range determined by example process 500.

Example process 500 may additionally or alternatively comprise operation 518. At operation 518, example process 500 may comprise calibrating the radar sensor based at least in part on the updated model, according to any of the techniques discussed herein. For example, calibrating the radar sensor may comprise determining a level arm and/or angle offset associated with the radar sensor based at least in part on the updated model (e.g., based on parameters associated with the updated model such as, for example, a phase/shift of the model). For example, a primary axis of the autonomous vehicle may deviate from a primary axis of the radar sensor(s) (e.g., a common reference frame of all radar sensors about the vehicle). Based at least in part on determining that the autonomous vehicle is not slipping laterally (e.g., based on sensor data received from one or more other sensors, such as a GPS, wheel encoders, an IMU) or taking into account such slippage, operation 518 may comprise determining an angle offset between a longitudinal axis of the autonomous vehicle and an expected axis of the radar device(s) based at least in part on a parameter of the model. For example, the parameter may be a phase shift of the model, e.g., shift 602 depicted in FIG. 6.

Note that, although the example process 500 is depicted as sequential operations, it is understood that the operations discussed herein may be performed in a different order, simultaneously, and/or by one or more devices.

Example Model Fittings

Figure 6:
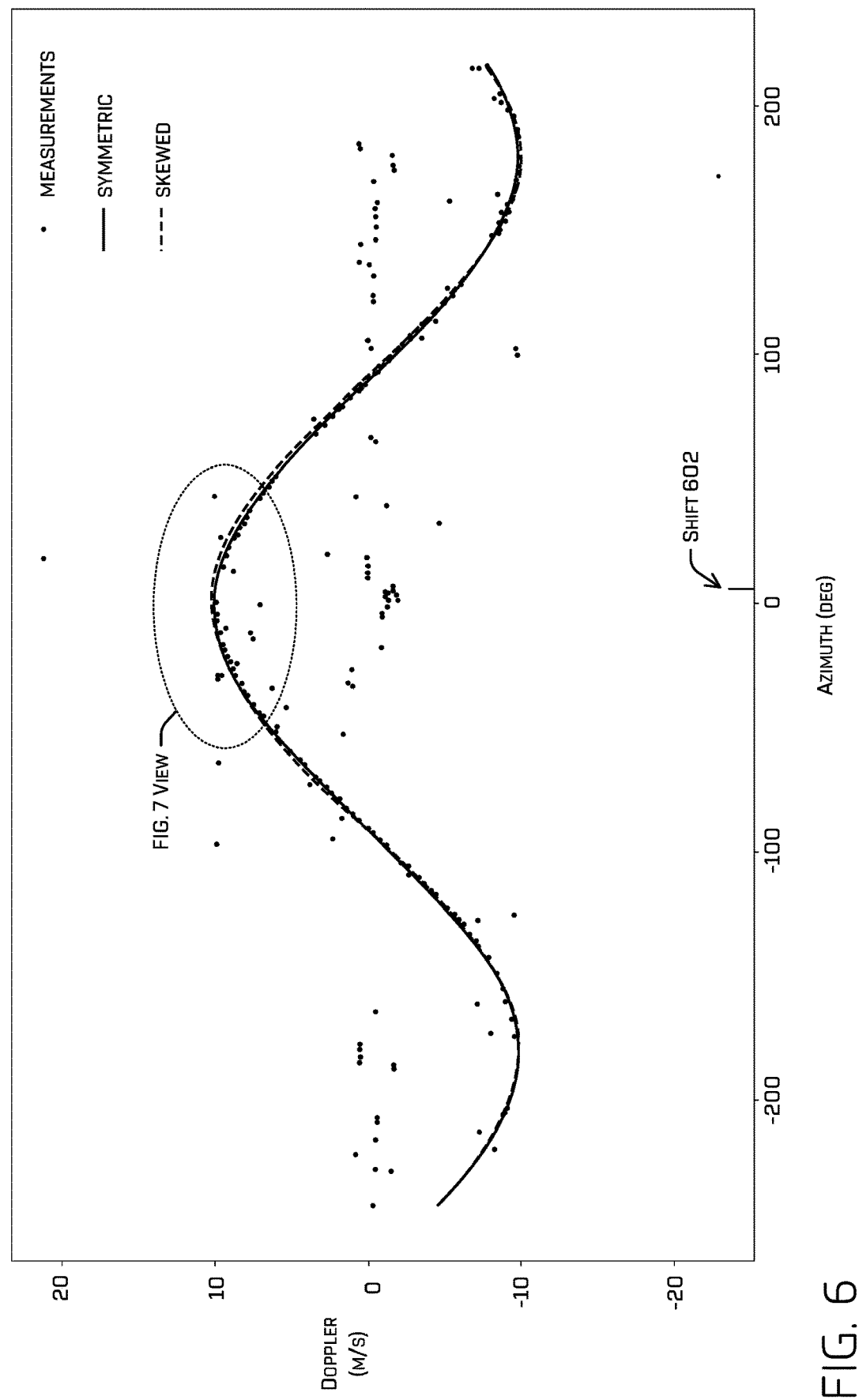
FIGS. 6 and 7 illustrate Doppler measurements and a first prediction of the Doppler values determined by a first model generated using a symmetric loss function and a second prediction of the Doppler values determined by a second model generated using the asymmetric loss function discussed herein.
Figure 7:
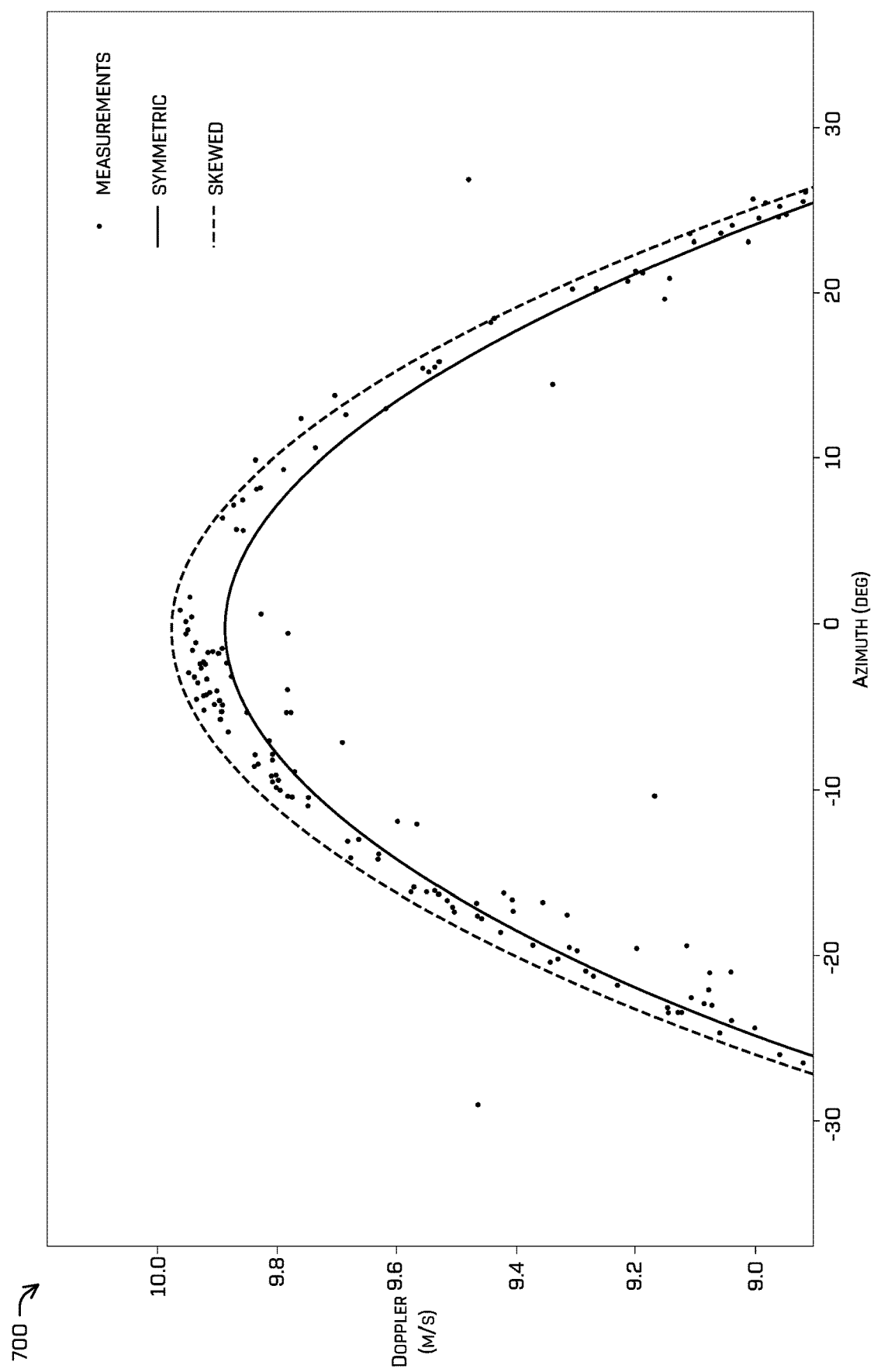

FIGS. 6 and 7 illustrate example graphs 600 and 700, respectively, of a same plot of Doppler measurements from a single collection of the radar device (e.g., which may comprise 50 milliseconds of data gathering, in one example, although the time may vary based on the device, whether shorter or longer). FIG. 6 also depicts a phase shift 602 of the skewed model, represented by a vertical line that indicates the azimuthal location of the maximum amplitude of the skewed model. FIGS. 6 and 7 comprise a comparison of Doppler predictions of a first model fit to the radar data according to a symmetric loss function (e.g., Gaussian), represented by a solid line, and Doppler predictions of a second model fit to the radar data according to the asymmetric loss function discussed herein. As FIG. 7 illustrates, although the first model generally fits the radar data well, the symmetric fit depicted in FIGS. 6 and 7 is off by approximately 1% or approximately 10 centimeters per second, and the second model that creates an upwardly shifted envelope more accurately models the actual Doppler values.

Example System

Figure 8:
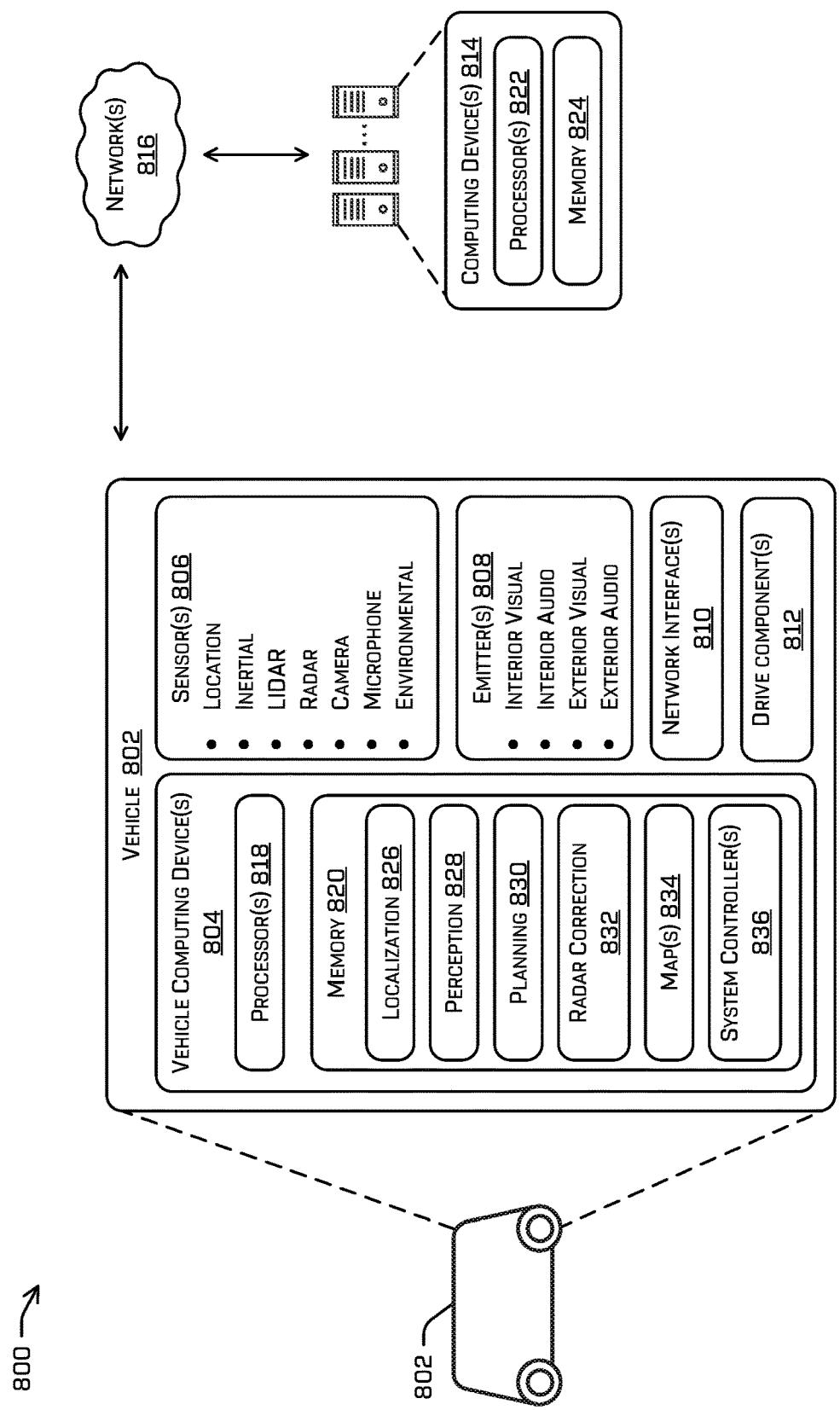
FIG. 8 illustrates a block diagram of an example system for correcting radar data for out-of-plane return error contributions, determining a velocity and/or position of an autonomous vehicle based at least in part on the corrected radar data, and/or controlling an autonomous vehicle based at least in part on the velocity and/or the position.

FIG. 8 illustrates a block diagram of an example system that implements the techniques discussed herein. In some instances, the system 800 may include a vehicle 802, which may represent the autonomous vehicle 102 in FIG. 1. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 802 may be a fully or partially autonomous vehicle having any other level or classification. Moreover, in some instances, the techniques described herein may be usable by non-autonomous vehicles as well.

The vehicle 802 may include a vehicle computing device(s) 804, sensor(s) 806, emitter(s) 808, network interface(s) 810, and/or drive component(s) 812.

In some instances, the sensor(s) 806 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 806 may include multiple instances of each of these or other types of sensors. For instance, the radar sensors may include individual radar sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device(s) 804 and/or to computing device(s) 814.

The vehicle 802 may also include emitter(s) 808 for emitting light and/or sound, as described above. The emitter(s) 808 in this example may include interior audio and visual emitter(s) to communicate with passengers of the vehicle 802. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include network interface(s) 810 that enable communication between the vehicle 802 and one or more other local or remote computing device(s). For instance, the network interface(s) 810 may facilitate communication with other local computing device(s) on the vehicle 802 and/or the drive component(s) 812. Also, the network interface (s) 810 may additionally or alternatively allow the vehicle to communicate with other nearby computing device(s) (e.g., other nearby vehicles, traffic signals, etc.). The network interface(s) 810 may additionally or alternatively enable the vehicle 802 to communicate with computing device(s) 814. In some examples, computing device(s) 814 may comprise one or more nodes of a distributed computing system (e.g., a cloud computing architecture).

The network interface(s) 810 may include physical and/or logical interfaces for connecting the vehicle computing device(s) 804 to another computing device or a network, such as network(s) 816. For example, the network interface(s) 810 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 804 and/or the sensor(s) 806 may send sensor data, via the network(s) 816, to the computing device(s) 814 at a particular frequency, after a lapse of a predetermined period of time, in near real-time, etc.

In some instances, the vehicle 802 may include one or more drive components 812. In some instances, the vehicle 802 may have a single drive component 812. In some instances, the drive component(s) 812 may include one or more sensors to detect conditions of the drive component(s) 812 and/or the surroundings of the vehicle 802. By way of example and not limitation, the sensor(s) of the drive component(s) 812 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 812. In some cases, the sensor(s) on the drive component(s) 812 may overlap or supplement corresponding systems of the vehicle 802 (e.g., sensor(s) 806).

The drive component(s) 812 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 812 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 812. Furthermore, the drive component(s) 812 may also include one or more communication connection(s) that enable communication by the respective drive component with one or more other local or remote computing device(s).

The vehicle computing device(s) 804 may include processor(s) 818 and memory 820 communicatively coupled with the one or more processors 818. Computing device(s) 814 may also include processor(s) 822, and/or memory 824. The processor(s) 818 and/or 822 may be any suitable processor capable of executing instructions to process data and perform operations as described herein. By way of example and not limitation, the processor(s) 818 and/or 822 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 820 and/or 824 may be examples of non-transitory computer-readable media. The memory 820 and/or 824 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 820 and/or memory 824 may store a localization component 826, perception component 828, planning component 830, radar correction component 832, map(s) 834, and/or system controller(s) 836. Localization component 826 may represent localization component 130, perception component 828 may represent perception component 132, planning component 830 may represent planning component 134, and/or radar correction component 832 may represent radar correction component 136.

In at least one example, the localization component 826 may include hardware and/or software to receive data from the sensor(s) 806 to determine a position, velocity, and/or orientation of the vehicle 802 (e.g., one or more of an x-, y-, z-position, roll, pitch, or yaw). For example, the localization component 826 may include and/or request/receive map(s) 834 of an environment and can continuously determine a location, velocity, and/or orientation of the autonomous vehicle within the map(s) 834. In some instances, the localization component 826 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 826 may provide data to various components of the vehicle 802 to determine an initial position of an autonomous vehicle for generating a trajectory and/or for generating map data, as discussed herein. In some examples, radar correction component 832 may be part of the localization component 826 and may implement the techniques discussed herein.

In some instances, perception component 828 may comprise a primary perception system, a secondary perception system, and/or a prediction system implemented in hardware and/or software. The memory 820 and/or 824 may additionally or alternatively store a mapping system, a planning system, a ride management system, etc. Although perception component 828 and/or planning component 830 are illustrated as being stored in memory 820 (and/or 824), perception component 828 and/or planning component 830 may include processor-executable instructions, machine-learned model(s) (e.g., a neural network), and/or hardware.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 820 may additionally or alternatively store one or more system controller(s) 836, which may be configured to control steering, propulsion, braking, safety, emitters, communication, and other systems of the vehicle 802. These system controller(s) 836 may communicate with and/or control corresponding systems of the drive component(s) 812 and/or other components of the vehicle 802. For example, the planning component 830 may generate instructions based at least in part on perception data generated by the perception component 828 (which may comprise any of the radar spatial grids and/or likelihoods discussed herein) and transmit the instructions to the system controller(s) 836, which may control operation of the vehicle 802 based at least in part on the instructions.

It should be noted that while FIG. 8 is illustrated as a distributed system, in alternative examples, components of the vehicle 802 may be associated with the computing device(s) 814 and/or components of the computing device(s) 814 may be associated with the vehicle 802. That is, the vehicle 802 may perform one or more of the functions associated with the computing device(s) 814, and vice versa.

Example Clauses

A. A method comprising: receiving, from a radar sensor associated with an autonomous vehicle, radar data comprising a Doppler value associated with a stationary object in an environment surrounding the autonomous vehicle; determining, as an error, a difference between the Doppler value and a predicted value from a model for the radar data; altering, as an updated model, one or more parameters of the model for the radar data to obtain an updated model, wherein: altering the one or more parameters of the model for the radar data is based at least in part on an asymmetrical loss function that comprises a first portion and a second portion, the first portion comprises a square of the error, the second portion is linearly proportional to the error, and the second portion is based at least in part on an estimated velocity of the vehicle and/or an estimated Doppler value; determining a velocity of the autonomous vehicle based at least in part on the updated model; and controlling the autonomous vehicle based at least in part on the velocity.

B. The method of paragraph A, wherein the one or more parameters comprises an estimated velocity of the autonomous vehicle, and wherein altering the one or more one or more parameters comprises at least one of increasing or decreasing the estimated velocity to optimize a total error associated with the radar data.

C. The method of either paragraph A or B, determining the velocity comprises: determining a lateral component of the velocity based at least in part on determining a shift of a sinusoid associated with the model; and determining a longitudinal component of the velocity based at least in part on at least one of an amplitude of the sinusoid or a reference trajectory.

D. The method of any one of paragraphs A-C, wherein the estimated velocity is based at least in part on at least one of: a previously-determined velocity; a random sample consensus associated with the radar data; sensor data comprising a measured velocity; or a trajectory indicating a target velocity received from a computing system associated with the autonomous vehicle.

E. The method of any one of paragraphs A-D, further comprising: determining an azimuthal offset associated with the updated model; and calibrating the radar sensor by adjusting an orientation associated with the radar sensor based at least in part on the azimuthal offset.

F. The method of any one of paragraphs A-E, wherein the asymmetric loss function comprises at least one of a Huber loss function or a Cauchy loss function.

G. A system comprising: one or more sensors; one or more processors; and a memory storing processor-executable instructions that, when executed by the one or more processors, cause the system to perform operations comprising: receiving, from a radar sensor on a moveable platform, radar data comprising a plurality of Doppler values; determining a model that fits the radar data, wherein: determining the model is based at least in part on adjusting a parameter of the model based at least in part on output of an asymmetrical loss function comprising a first portion and a second portion, the first portion is quadratic, the second portion is linear; and the second portion is based at least in part on at least one of an estimated velocity of the moveable platform or at least one of the plurality of Doppler values; and determining a velocity of the moveable platform based at least in part on the model.

H. The system of paragraph G, wherein the parameter comprises an estimated velocity of the moveable platform, and adjusting the parameter comprises at least one of increasing or decreasing the estimated velocity to optimize a total residual associated with the radar data, the total residual indicative of a difference between the estimated velocity and a measured velocity.

I. The system of either paragraph G or H, wherein determining the velocity comprises: determining a lateral component of the velocity based at least in part on determining a shift of a sinusoid associated with the model; and determining a longitudinal component of the velocity based at least in part on at least one of an amplitude of the sinusoid or a reference trajectory.

J. The system of any one of paragraphs G-I, wherein the estimated velocity is based at least in part on at least one of: a previously-determined velocity; a random sample consensus associated with the radar data; sensor data comprising a measured velocity; or a trajectory indicating a target velocity received from a computing device.

K. The system of any one of paragraphs G-J, wherein the second portion penalizes the parameter inversely proportional to at least one of a measured Doppler value or a vertical field of view associated with the radar sensor.

L. The system of any one of paragraphs G-K, wherein the operations further comprise: determining a phase offset associated with the updated model; and calibrating the radar sensor by adjusting an orientation associated with the radar sensor based at least in part on the phase offset.

M. The system of any one of paragraphs G-L, wherein the moveable platform is associated with an autonomous vehicle and the method further comprises controlling the autonomous vehicle based at least in part on the velocity.

N. A non-transitory computer-readable medium storing processor-executable instructions that, when executed by one or more processors, cause the one or more processors to perform operations comprising: receiving, from a radar sensor associated with a moveable platform, radar data comprising a plurality of Doppler values; determining a model that fits the radar data, wherein: determining the model is based at least in part on adjusting a parameter of the model based at least in part on output of an asymmetrical loss function comprising a first portion and a second portion, the first portion is quadratic, the second portion is linear; and the second portion scales is based at least in part on at least one of an estimated velocity of the moveable platform or at least one of the plurality of Doppler values; and determining a velocity of the moveable platform based at least in part on the model.

O. The non-transitory computer-readable medium of paragraph N, wherein the parameter comprises an estimated velocity of the movable platform, and adjusting the parameter comprises at least one of increasing or decreasing the estimated velocity to optimize a total residual associated with the radar data, the total residual indicative of a difference between the estimated velocity and a measured velocity.

P. The non-transitory computer-readable medium of either paragraph N or O, wherein determining the velocity comprises: determining a lateral component of the velocity based at least in part on determining a shift of a sinusoid associated with the model; and determining a longitudinal component of the velocity based at least in part on at least one of an amplitude of the sinusoid or a reference trajectory.

Q. The non-transitory computer-readable medium of any one of paragraphs N-P, wherein the estimated velocity is based at least in part on at least one of: a previously-determined velocity; a random sample consensus associated with the radar data; sensor data comprising a measured velocity; or a trajectory indicating a target velocity received from a computing device.

R. The non-transitory computer-readable medium of any one of paragraphs N-Q, wherein the second portion penalizes the parameter inversely proportional to at least one of a measured doppler value or a vertical field of view associated with the radar sensor.

S. The non-transitory computer-readable medium of any one of paragraphs N-R, wherein the operations further comprise: determining a phase offset associated with the updated model; and calibrating the radar sensor by adjusting an orientation associated with the radar sensor based at least in part on the phase offset T. The non-transitory computer-readable medium of any one of paragraphs N-S, wherein the moveable platform is associated with an autonomous vehicle and the method further comprises controlling the autonomous vehicle based at least in part on the velocity.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving, from a radar sensor associated with an autonomous vehicle, radar data comprising a Doppler value associated with a stationary object in an environment surrounding the autonomous vehicle;
   determining, as an error, a difference between the Doppler value and a predicted value from a model for the radar data;
   altering, as an updated model, one or more parameters of the model for the radar data to obtain an updated model, wherein:
      the one or more parameters comprises an estimated velocity of the autonomous vehicle,
      altering the one or more parameters of the model for the radar data is based at least in part on an asymmetrical loss function that comprises a first portion and a second portion,
      the first portion comprises a square of the error,
      the second portion is linearly proportional to the error
      the second portion is based at least in part on an estimated velocity of the vehicle, and
      altering the one or more one or more parameters comprises at least one of increasing or decreasing the estimated velocity to optimize a total error associated with the radar data;
   determining a velocity of the autonomous vehicle based at least in part on the updated model; and
   controlling the autonomous vehicle based at least in part on the velocity.

2. The method of claim 1, determining the velocity comprises:
   determining a lateral component of the velocity based at least in part on determining a shift of a sinusoid associated with the model; and
   determining a longitudinal component of the velocity based at least in part on at least one of an amplitude of the sinusoid or a reference trajectory.

3. The method of claim 1, wherein the estimated velocity is based at least in part on at least one of:
   a previously-determined velocity;
   a random sample consensus associated with the radar data;
   sensor data comprising a measured velocity; or
   a trajectory indicating a target velocity received from a computing system associated with the autonomous vehicle.

4. The method of claim 1, further comprising:
   determining an azimuthal offset associated with the updated model; and
   calibrating the radar sensor by adjusting an orientation associated with the radar sensor based at least in part on the azimuthal offset.

5. The method of claim 1, wherein the asymmetric loss function comprises at least one of a Huber loss function or a Cauchy loss function.

6. A system comprising:
   one or more sensors;
   one or more processors; and
   a memory storing processor-executable instructions that, when executed by the one or more processors, cause the system to perform operations comprising:
      receiving, from a radar sensor on a moveable platform associated with an autonomous vehicle, radar data comprising a plurality of Doppler values;
      determining a model that fits the radar data, wherein:
         determining the model is based at least in part on adjusting a parameter of the model based at least in part on output of an asymmetrical loss function comprising a first portion and a second portion, the first portion is quadratic, the second portion is linear; and the second portion is based at least in part on at least one of an estimated velocity of the moveable platform or at least one of the plurality of Doppler values;

determining a velocity of the moveable platform based at least in part on the model; and controlling the autonomous vehicle based at least in part on the velocity.

7. The system of claim 6, wherein the parameter comprises an estimated velocity of the moveable platform, and adjusting the parameter comprises at least one of increasing or decreasing the estimated velocity to optimize a total residual associated with the radar data, the total residual indicative of a difference between the estimated velocity and a measured velocity.

8. The system of claim 6, wherein determining the velocity comprises:

determining a lateral component of the velocity based at least in part on determining a shift of a sinusoid associated with the model; and determining a longitudinal component of the velocity based at least in part on at least one of an amplitude of the sinusoid or a reference trajectory.

9. The system of claim 6, wherein the estimated velocity is based at least in part on at least one of:

a previously-determined velocity;

a random sample consensus associated with the radar data;

sensor data comprising a measured velocity; or a trajectory indicating a target velocity received from a computing device.

10. The system of claim 6, wherein the second portion penalizes the parameter inversely proportional to at least one of a measured Doppler value or a vertical field of view associated with the radar sensor.

11. The system of claim 6, wherein the operations further comprise:

determining a phase offset associated with the updated model; and calibrating the radar sensor by adjusting an orientation associated with the radar sensor based at least in part on the phase offset.

12. A non-transitory computer-readable medium storing processor-executable instructions that, when executed by one or more processors, cause the one or more processors to perform operations comprising:

receiving, from a radar sensor associated with a moveable platform associated with an autonomous vehicle, radar data comprising a plurality of Doppler values;

determining a model that fits the radar data, wherein:

determining the model is based at least in part on adjusting a parameter of the model based at least in part on output of an asymmetrical loss function comprising a first portion and a second portion, the first portion is quadratic, the second portion is linear; and the second portion scales is based at least in part on at least one of an estimated velocity of the moveable platform or at least one of the plurality of Doppler values;

determining a velocity of the moveable platform based at least in part on the model; and controlling the autonomous vehicle based at least in part on the velocity.

13. The non-transitory computer-readable medium of claim 12, wherein the parameter comprises an estimated velocity of the movable platform, and adjusting the parameter comprises at least one of increasing or decreasing the estimated velocity to optimize a total residual associated with the radar data, the total residual indicative of a difference between the estimated velocity and a measured velocity.

14. The non-transitory computer-readable medium of claim 12, wherein determining the velocity comprises:

determining a lateral component of the velocity based at least in part on determining a shift of a sinusoid associated with the model; and determining a longitudinal component of the velocity based at least in part on at least one of an amplitude of the sinusoid or a reference trajectory.

15. The non-transitory computer-readable medium of claim 12, wherein the estimated velocity is based at least in part on at least one of:

a previously-determined velocity;

a random sample consensus associated with the radar data;

sensor data comprising a measured velocity; or a trajectory indicating a target velocity received from a computing device.

16. The non-transitory computer-readable medium of claim 12, wherein the second portion penalizes the parameter inversely proportional to at least one of a measured doppler value or a vertical field of view associated with the radar sensor.

17. The non-transitory computer-readable medium of claim 12, wherein the operations further comprise:

determining a phase offset associated with the updated model; and calibrating the radar sensor by adjusting an orientation associated with the radar sensor based at least in part on the phase offset.

* * * * *